Feb. 24, 1925.
J. H. MILLER
1,527,425
ELECTRICAL MEASURING EQUIPMENT
Filed Aug. 12, 1922
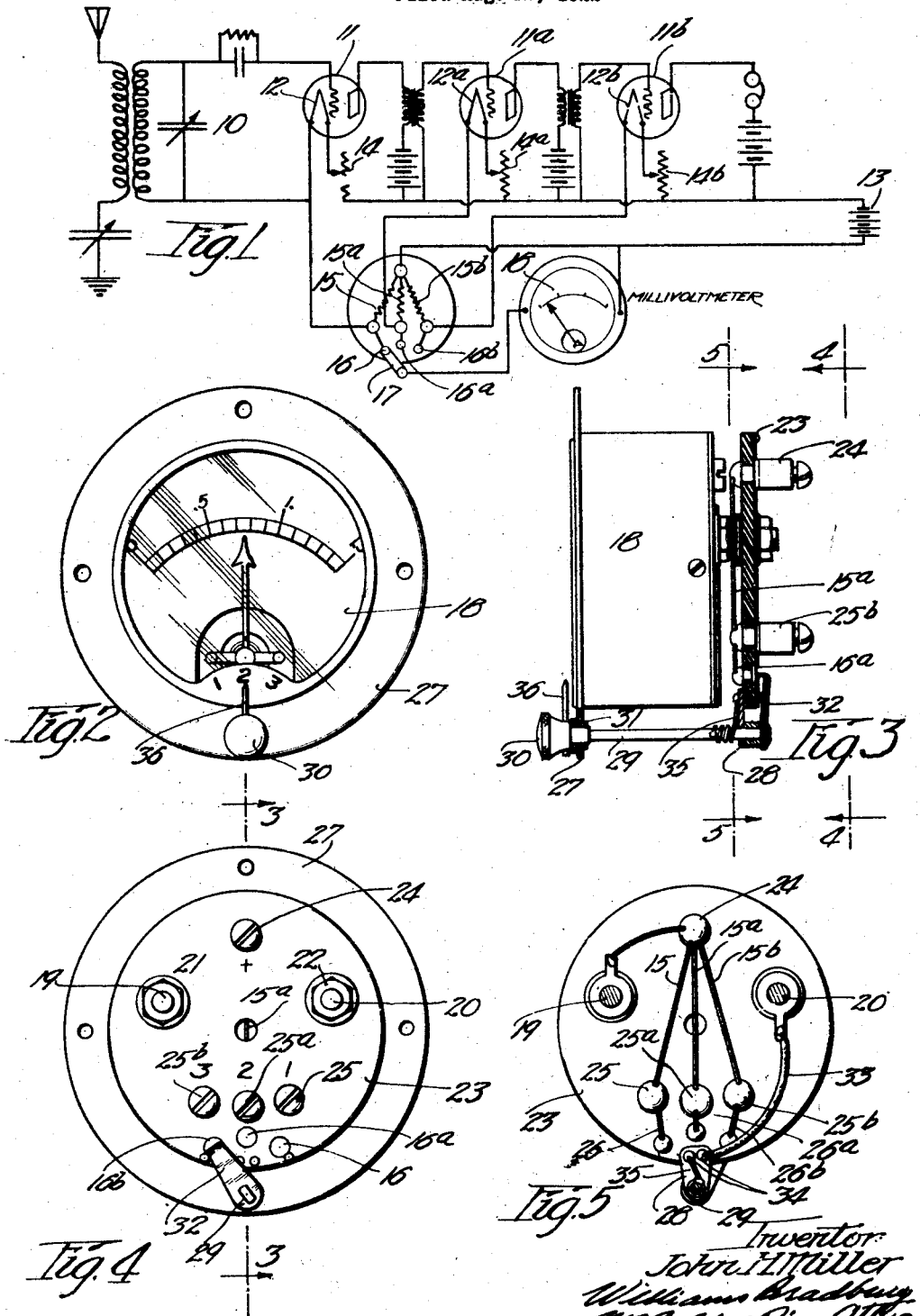

Patented Feb. 24, 1925.

1,527,425

UNITED STATES PATENT OFFICE.

JOHN H. MILLER, OF OAK PARK, ILLINOIS, ASSIGNOR TO JEWELL ELECTRICAL INSTRUMENT COMPANY, OF CHICAGO, ILLINOIS, A CORPORATION OF ILLINOIS.

ELECTRICAL MEASURING EQUIPMENT.

Application filed August 12, 1922. Serial No. 581,375.

*To all whom it may concern:*

Be it known that I, JOHN H. MILLER, a citizen of the United States, and resident of Oak Park, in the county of Cook and State of Illinois, have invented certain new and useful Improvements in Electrical Measuring Equipment, of which the following is a full, clear, concise, and exact description, reference being had to the accompanying drawings, forming a part of this specification.

This invention relates to means associated with wireless receiving circuits employing a plurality of audions for conveniently and accurately measuring the current flow through the filaments of the audions.

In receiving circuits, such as employed in wireless telephony or telegraphy, and also in similar circuits where a plurality of audions is used, it is very desirable to provide means for accurately measuring the current flow through the filaments of the audion tubes. Where a measuring device is bodily inserted in the circuit of the filament, the current flow through which is to be measured, variations and inaccuracies creep in. This process is, therefore, not only slow but also inaccurate.

The present invention has for its object the provision of circuits and apparatus by means of which the current flow through the filaments of the several audions used in a receiving circuit may be conveniently and accurately measured.

The principal feature of the invention is the provision of a plurality of resistances, each of which is in series with an audion filament, and a manually operable switch, through the medium of which the current measuring device, as a millivoltmeter, may be included in parallel with any desired one of these resistances.

Other features and advantages will appear from time to time as the description of the invention progresses.

Referring now to the drawings,

Figure 1 diagrammatically shows a receiving circuit, and schematically indicates the resistances above referred to, the millivoltmeter, and the switch, by means of which the millivoltmeter is included in parallel with any desired one of the resistances;

Figure 2 is a face view of the millivoltmeter;

Figure 3 is a side view of the millivoltmeter showing the switching device and the resistances associated therewith;

Figure 4 is a view from the line 4—4 of Figure 3, and

Figure 5 is a view on the line 5—5 of Figure 3 looking in the direction of the arrows.

Referring now to the drawings, in which like reference characters indicate like parts in the several views, 10 indicates, generally, a receiving circuit which may be of any usual or desired type. The circuit 10 is provided with a plurality of audions 11, 11$^a$ and 11$^b$, having the filaments 12, 12$^a$ and 12$^b$ respectively. In series with the filaments 12, 12$^a$ and 12$^b$ is a source of current 13, and the rheostats 14, 14$^a$ and 14$^b$, respectively. The filaments on the sides remote from the rheostats 14 are joined to the resistances 15, 15$^a$ and 15$^b$, respectively.

Extending from the resistances 15, 15$^a$ and 15$^b$ is a common conductor which leads to the opposite side of the source of current 13. Thus, it will be noted that the resistances 15, 15$^a$ and 15$^b$ are permanently connected in series with the filaments 12, 12$^a$ and 12$^b$, respectively.

The resistances are joined to a series of contacts 16, 16$^a$ and 16$^b$, respectively, arranged to be engaged by a manually operable movable contact or wiper 17. The wiper 17 is joined to one terminal of the millivoltmeter 18, the opposite terminal of the millivoltmeter being joined to the conductor leading from the resistances 15 to the source of current 13.

Whenever the movable contact or wiper 17 is in engagement with one of the contacts 16, 16$^a$ or 16$^b$, the millivoltmeter 18 will be joined in parallel with the corresponding resistance 15, 15$^a$ or 15$^b$, and in series with the corresponding filament 12, 12$^a$ or 12$^b$. Thus, in order to determine the current flow through any desired one of the filaments, it is only necessary to move the wiper 17 to the corresponding contacts 16, 16$^a$ or 16$^b$, and read the indication on the millivoltmeter dial.

We will now consider the physical arrangement of the resistances 15, contact 16, wiper 17, their electrical connections, and their relation to the millivoltmeter 18.

The millivoltmeter 18 may, in general, be of the conventional type. Secured to the rear of the millivoltmeter, through the medium of the terminal posts 19 and 20 and nuts 21 and 22 is a disc 23 of insulating material. Extending through the disc 23 is a binding post 24, to the inner end of which is secured, preferably by means of solder, the ends of the resistances 15, 15$^a$ and 15$^b$, of German silver or other suitable material. The opposite ends of the resistances are joined in a similar manner to the binding posts 25, 25$^a$ and 25$^b$, respectively. The binding posts 25, 25$^a$ and 25$^b$ are joined, through the medium of the conductors 26, 26$^a$ and 26$^b$ respectively, to the contacts 16, 16$^a$ and 16$^b$, respectively.

Rotatably mounted in the flange 27 at the face of the millivoltmeter, and in a bracket member 28 carried by the disc 23, is a shaft or rod 29 provided on its upper end with the knurled thumb piece 30. The shaft 29 and thumb piece 30 are insulated from the flange 27 by means of the insulating collar 31. Secured to the end of the shaft 29, remote from the thumb piece 30, is a movable contact or wiper 32 adapted to engage one or another of the contacts 16, 16$^a$ or 16$^b$ as the shaft 29 is rotated.

A conductor 33 joins the terminal post 20 to one of the rivets 34, by means of which the bracket member 28 is secured to the disc 23. A flexible conductor 35 has one end joined to the other rivet 34, and its opposite end loosely coiled about the shaft 29 and secured thereto by means of solder. The other terminal post 19 is secured to the binding post 24 to which is also secured one end of each of the resistances 15, 15$^a$ and 15$^b$.

Projecting outwardly from the thumb piece 30 is the indicator or pointer 36, and associated therewith is a plurality of digits 1, 2, 3. The pointer and the digits are so arranged that when the indicator 36 points to digit 1, the wiper 32 will be in engagement with the contact 16; when it points to 2, in engagement with contact 16$^a$, etc.

From the above, it is obvious that when it is desired to compare the current flow through the several filaments, it is only necessary to rotate the wiper 32 from contact to contact and read the indication on the dial of the millivoltmeter 18. Due to the fact that the various connections are permanent, and preferably soldered, no variations can enter into the resistances of the circuits from time to time and thus affect the accuracy of the meter readings.

While in the above description and in the drawings, applicant has disclosed what he now considers the preferred embodiment of his invention, it is to be understood that variations therein are contemplated and the invention is, therefore, to be limited merely by the scope of the appended claims.

Having thus described my invention, what I claim is new and desire to secure by Letters Patent of the United States is:

1. In a device of the class described, an electrical potential measuring instrument, a housing therefor, a contact support mounted upon and carried as a unit with said housing, a multiplicity of contacts carried by said support, and a wiper journaled in said housing and electrically connected with one terminal of said instrument adapted selectively to connect said terminal with any one of said contacts.

2. In a device of the class described, an electrical potential measuring instrument, a housing therefor, said housing being provided at its forward face with a mounting flange and provided at the back thereof with a contact support, said contact support being carried as a unit with said housing, a multiplicity of contacts carried by said support, a rock shaft rotatably supported by said mounting flange and said contact support, a wiper carried by said rock shaft adapted to co-operate with said contacts, means electrically connecting said wiper with one terminal of said instrument, and an index carried by the mounting flange whereby said rock shaft and wiper may be operated selectively to connect any one of said contacts with the aforesaid terminal of the measuring instrument.

3. In an electrical measuring unit of the class described, an electrical measuring instrument, a housing therefor, a switching panel of insulation supported at the rear of said housing, contacts carried by said switching panel, connector terminals for said contacts, a wiper shaft pivotally supported by a portion of said housing, and a wiper on said shaft adapted selectively to engage said contacts.

4. In an electrical measuring unit of the class described, the combination of electrical measuring means, a cylindrical housing therefor, a switching panel comprising a disc of insulation supported at the rear of said housing and being of no greater diameter than said housing, a plurality of contacts carried by said disc of insulation, terminal posts for said contacts, a wiper shaft pivotally supported by a portion of said housing, and a wiper on said shaft adapted selectively to engage with said contacts.

5. In an electrical measuring unit of the class described, the combination of electrical measuring means, a cylindrical housing therefor, a panel of insulation supported on the rear end of said housing, a plurality of switching contacts supported on said panel, terminal posts for each of said contacts supported on said panel, resistance elements connected to said switching contacts, a wiper shaft pivotally supported by said housing, a wiper on said shaft adapted to engage said switching contacts, and means electrically connecting said electrical measuring means with said resistance elements and with said wiper, said panel, switching contacts, terminal posts and resistance elements being all confined within the diameter circumscribed by the diameter of said housing.

6. In an instrument adapted for installation on a panel or the like, the combination of a housing provided with a mounting flange at its forward end, electrical measuring mechanism in said housing, switch mechanism at the rear of said housing adapted to include said measuring mechanism in selected circuits, and means for operating said switch mechanism comprising a rock shaft rotatably supported by and extending through said mounting flange.

In witness whereof, I hereunto subscribe my name this 7 day of August, 1922.

JOHN H. MILLER.

Witnesses:
 DAGMAR PETERSON,
 ALICE M. BERTONCINI.